United States Patent
Chi et al.

(10) Patent No.: US 9,298,853 B2
(45) Date of Patent: Mar. 29, 2016

(54) SYSTEM AND METHODS FOR PRIORITIZING QUERIES UNDER IMPRECISE QUERY EXECUTION TIME

(71) Applicant: NEC Laboratories America, Inc., Princeton, NJ (US)

(72) Inventors: Yun Chi, Monte Sereno, CA (US); Vahit Hakan Hacigumus, San Jose, CA (US); Wang-Pin Hsiung, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 222 days.

(21) Appl. No.: 14/070,603

(22) Filed: Nov. 4, 2013

(65) Prior Publication Data

US 2014/0129588 A1     May 8, 2014

Related U.S. Application Data

(60) Provisional application No. 61/723,640, filed on Nov. 7, 2012.

(51) Int. Cl.
*G06F 7/00*     (2006.01)
*G06F 17/30*     (2006.01)

(52) U.S. Cl.
CPC .................. *G06F 17/30979* (2013.01)

(58) Field of Classification Search
None
See application file for complete search history.

(56) References Cited

U.S. PATENT DOCUMENTS

| | | | |
|---|---|---|---|
| 7,448,022 B1* | 11/2008 | Ram | G06F 8/00 717/120 |
| 2004/0059655 A1* | 3/2004 | Seifert | G06Q 40/00 705/35 |
| 2005/0049924 A1* | 3/2005 | DeBettencourt et al. | 705/21 |
| 2006/0013505 A1* | 1/2006 | Yau et al. | 382/285 |
| 2009/0222319 A1* | 9/2009 | Cao | G06Q 30/02 705/7.29 |
| 2012/0023501 A1* | 1/2012 | Chi et al. | 718/103 |

* cited by examiner

*Primary Examiner* — Tuan A Pham
(74) *Attorney, Agent, or Firm* — Joseph Kolodka

(57) ABSTRACT

Systems and methods for prioritizing queries in a cloud based database by determining a priority score in real time under an imprecise query execution time; and incrementally maintaining query priority scores.

19 Claims, 4 Drawing Sheets

Figure 300

SYSTEM AND METHODS FOR PRIORITIZING QUERIES UNDER IMPRECISE QUERY EXECUTION TIME

The present application is a utility conversion and claims priority to Provisional Application Ser. No. 61/723,640 filed Nov. 7, 2012, the content of which is incorporated by reference.

BACKGROUND

This invention gives a system and method for scheduling the priority among queries with different service level agreements and with imprecise query execution time.

Query scheduling is a fundamental problem in database systems. The focus of this invention is on cost-aware query scheduling algorithms, which are very important in traditional databases as well as platforms such as database-as-a-service (DaaS) in the cloud. In the cloud, because of service level agreements (SLAs), the scheduling decisions may have direct monetary consequences to service providers. However, existing cost-aware scheduling algorithms assumed that the exact query execution time of a query is known before the query is actually executed, which is an unrealistic assumption in most database systems. In such deployments, schedulers try to maximize performance with respect to service level agreements (SLAs) that may impose financial penalties for missed deadlines.

While there has been a great deal of work investigating different scheduling algorithms, there has been comparatively little work investigating what the scheduling algorithms can or should know about the queries to be scheduled. Clearly, the ideal would be to know the precise running time for every query in advance of its execution; in some sense this is "perfect" knowledge about the queries to be run and one cannot do better.

Previously, there were two approaches to the problem. One is to assume the exact query execution time is known beforehand. Such an assumption is rarely valid in real applications. The second approach is to use certain estimations on query execution time, such as the mean execution time or max execution time. Such estimations will mislead the scheduling decisions and therefore result in bad performances.

Conventional query scheduling to meet the requirements of SLAs has at least implicitly assumed that such information is available; unfortunately, this ideal is most likely not achievable in many real-world scenarios. The reason this is not achievable is simple: estimating the running time of queries is a notoriously difficult problem, as query running time is a complex function of the query itself (including any run-time parameters), the data over which it is run, and the environment in which it executes (including both the static hardware configuration and dynamic factors such as the contents of the buffer pool and the impact of concurrently running queries.) Despite a great deal of decade-old and recent effort, accurate prediction of query running times for dynamic, concurrent workloads remains largely elusive.

SUMMARY

In one aspect, systems and methods are disclosed for prioritizing queries in a cloud based database by determining a priority score in real time under an imprecise query execution time; and incrementally maintaining query priority scores.

Advantages of the preferred embodiments may include one or more of the following. The system can prioritize queries with higher quality: rCBS is robust to the imprecision in query execution time estimation—it exhaustively considers all the possible values of the execution time of a query together with their corresponding consequences, and therefore it does not rely on the exact query execution time, which is impractical to obtain beforehand. The system enjoys low complexity/faster operation: rCBS is highly scalable—it leverages dynamic convex hull algorithms and the principle of superposition, which result in a logarithmic time complexity, and therefore it can efficiently handle large number of queries with different SLAs in real time.

The cost-aware scheduling algorithm rCBS is both robust and scalable. rCBS has both rigorous theoretic underpinnings and great potentials in real applications—it is based on a very intuitive probabilistic model and it can handle various costs such as resource cost and SLA penalty cost in a dynamic fashion. rCBS can be used with other types of SLA functions such as piecewise linear functions, and to support transactions, which may consist of multiple dependent queries.

DESCRIPTION

In database systems, when the predictions on query execution time are imprecise, there are two choices: either we can ignore the imprecision and use a typical execution time such as the mean value, or we can explicitly model and take such imprecision into account in scheduling decisions.

The system schedules the priority among queries with different service level agreements and with imprecise query execution time. The system uses robust cost-based scheduling (rCBS), that does not require prior knowledge about the exact query execution time. Instead, rCBS explicitly evaluates all the possible values of the execution time of a query as well as their corresponding costs. As a result, rCBS both gives superior performance in terms of low query cost and at the same time, offers robustness in terms of high tolerance to imprecision in query execution time. Furthermore, we present an efficient implementation of rCBS, by using an incremental convex hull algorithm, that can handle queries with step-wise SLA functions in an O(log N) time complexity, where N is the number of queries are to be scheduled.

The system uses a cost-aware scheduling process called Shepherd with rigorous theoretic underpinnings as well as potential in real applications; it is robust to imprecision in query execution time prediction; and it is highly scalable. Such robustness and efficiency are both supported by our empirical studies.

Figure 1:
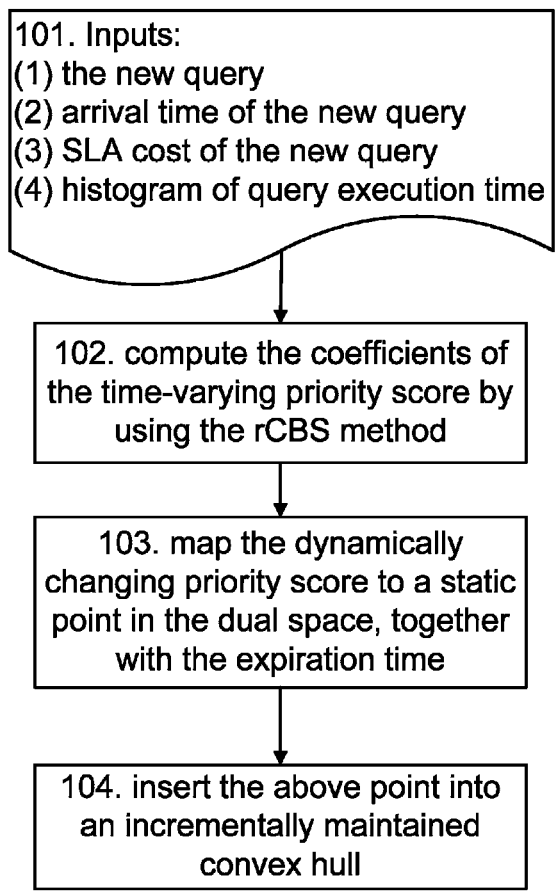
FIG. 1 shows an exemplary process for processing a query arrival.

FIG. 1 shows an exemplary process for processing a query arrival. The process receives as inputs a new query, an arrival time of the new query, an SLA cost of the new query, and a histogram of a query execution time (101). The process determines one or more coefficients of the time-varying priority score by using the rCBS method (102). The process then maps the dynamically changing priority score to a static point in the dual space, together with an expiration time (103). The process then inserts the determined point into an incrementally maintained convex hull (104).

Figure 2:
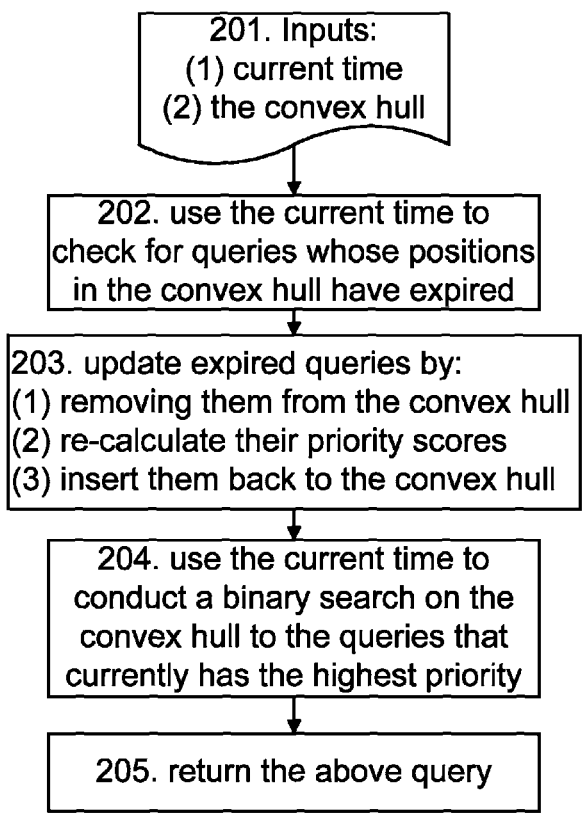
FIG. 2 shows an exemplary process for dispatching a query.

FIG. 2 shows an exemplary process for dispatching a query. The process receives a current time and a convex hull as inputs (201). The process then uses the current time to check for queries whose positions in the convex hull have expired (202). Next, the expired queries are updated by: 1) removing them from the convex hull, 2) recalculating their priority scores, and 3) inserting the expired queries back into the convex hull (203). The process uses the current time to conduct a binary search on the convex hull to the queries that currently have the highest priority (204) and returns the query) 205).

Figure 3:
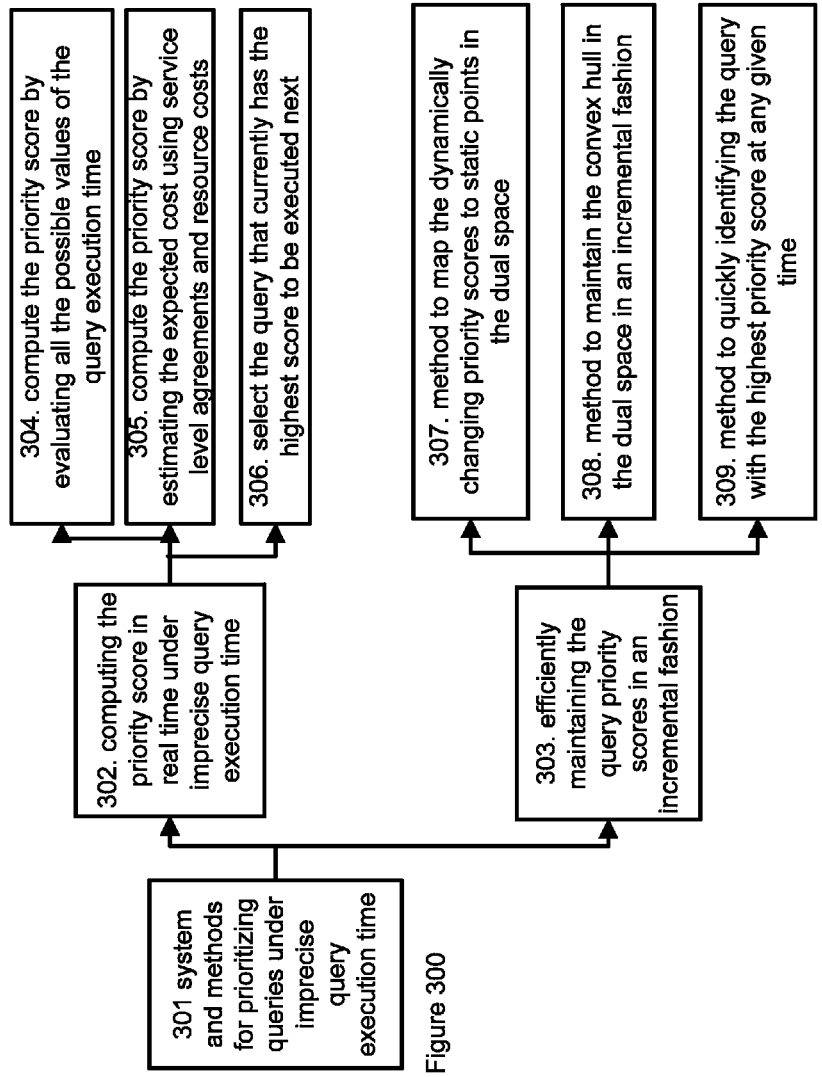
FIG. 3 shows an exemplary process for prioritizing queries under imprecise query execution time.

FIG. 3 shows an exemplary process for prioritizing queries under imprecise query execution time (301). The process includes determining a priority score in real time under an imprecise query execution time; (302) and incrementally maintaining a plurality of query priority scores (303). In 302, the method uses a novel method to evaluate all the possible values for the execution time of each query, together with the corresponding costs. The evaluation is compute in a close-form which is very efficient. Such a comprehensive evaluation makes the priority score robust to the imprecise query execution time. In 303, the method applies the concept of dual space of linear functions and an incrementally maintained convex hull. As a result, the dynamically changing priority scores are mapped to static points. This method makes prioritization very efficient, while the method always give exactly the same result as a naïve re-calculation method will give.

The method also includes determining the priority score by evaluating all possible values of the query execution time (304). The priority score can be generated by estimating an expected cost using a service level agreement and a resource cost (305). The method can select a query that currently has a highest score for execution next (306). The method also includes mapping dynamically changing priority scores to static points in a dual space (307). The convex hull can be incrementally maintained in a dual space (308). The method also includes identifying a query with a highest priority score at a predetermined time (309).

Instead of relying on a single point estimation of query execution time, the method evaluates all possible values of the query execution time, with their corresponding probabilities. Together with the consideration of the corresponding SLA costs, the system give robust priority score that tolerates imprecise query execution time estimation.

The method also efficiently maintains the time-varying priority scores. The efficiency mainly comes from two techniques. First, the dynamically changing priority scores are mapped to static points in the dual space, which makes the real time prioritization efficient. Second, the priority scores are maintained in an incremental fashion, where both inserting new queries and removing old queries can be handled with logarithmic time complexity.

The probability distributions of execution times can be effectively exploited for scheduling queries in the presence of SLA constraints. We do so by exhibiting one instance of such a distribution-based algorithm called Shepherd which builds upon CBS to consider a distribution-based execution time model rather than the traditional point-based execution modelShepherd is the first scheduling algorithm designed for database systems that uses distributions to model query execution times.

In Shepherd, instead of relying on a single point estimation for the execution time of a query q, we consider all the possible values of the execution time of q, together with their consequences in terms of SLA penalty cost. Note that this is very different from relying on a single estimated mean value for the execution time of q.

We first describe how a priority score is defined in Shepherd. In Shepherd, we represent the execution time of q not as a constant, but instead, as a random variable R that follows a probability distribution. With this representation, we define the Shepherd priority score in a spirit similar to that of CBS, except that all the possible values of R are evaluated, according to the probability that they occur. Specifically, the Shepherd score is defined as:

$$p_q(t) = \frac{1}{E[R]}(E[C_{delay}(t)] - E[C_{now}(t)])$$

$$= \frac{\int_{r=0}^{\infty} p(r) \left[ \int_{\tau=0}^{\infty} be^{-b\tau} \cdot c(t+\tau, r)\,d\tau - c(t, r) \right] dr}{\int_{r=0}^{\infty} r \cdot p(r)\,dr},$$

where $p(r)$ is the probability density function of R, the random variable representing the execution time of q.

Comparing to the CBS score in Equation (1), we can see several distinguishing points. First, the r term in Equation (1) is replaced by $E[R]$. This is because the query execution time is not fixed but instead is a random variable R with mean value $E[R]$. Second, $c_{now}(t)$ is replaced by $E[C_{now}(t)]$. This is because that the query execution time R is a random variable, and therefore even if we start the execution of q immediately, the cost is still a random variable $c_{now}(t)$, and $E[C_{now}(t)]$ captures the expected value of $C_{now}(t)$. In addition, although comparing Equation (3) with Equation (1), the form for the term $E[C_{delay}(t)]$ does not change, the details have changed because the expectation is now taken over two random variables R and $\Sigma$.

The Shepherd score can be complicated, which naturally raises concerns about its practicality. On the one hand, the equation does achieve the goal of evaluating over all the possible execution times for q; on the other hand, this evaluation requires a double integration. Furthermore, this evaluation (which is time-varying) has to be conducted at any time t when a scheduling decision is to be made, for all queries waiting to be serviced at time t. In the remainder of this paper, a main theme is to make the Shepherd scores more manageable through analysis, simplifications, and special-purpose techniques. We start by carefully deriving closed-form solutions to the Shepherd score under special scenarios. We first analyze Shepherd scores in a very simple scenario, where the query execution time follows a uniform distribution and the SLA cost is a single-step function. We use this simple scenario to illustrate the desirable properties of the Shepherd score and we postpone the description of more general scenarios to the next section.

Next, we focus on cases where R follows a uniform distribution. That is, if we start the execution of query q at time t, q's finishing time is uniformly distributed between $t+r_1$ and $t+r_2$ and $$h = \frac{1}{r_2 - r_1}.$$

In addition, we assume that the SLA cost function is a single-step function with a single deadline d and a jump of height c for the cost of missing the deadline.

Next the derivation of $E[C_{now}(t)]$ is detailed. At time t, if we immediately start the execution of q, there can be three cases, depending on the relation between d and $(t+r_1, t+r_2)$:

In this case, q can meet its deadline no matter what its execution time R is (as long as R falls between $t+r_1$ and $t+r_2$, which is guaranteed). Therefore $$E[C_{now}(t)]=0.$$

The expected cost of starting query q immediately at time t is proportional to the probability that R falls after the deadline d, and we can show $$E[C_{now}(t)]=(t+r_2-d)hc.$$

As q cannot meet its deadline, we have $$E[C_{now}(t)]=(r_2-r_1)hc.$$

Since we have $$h = \frac{1}{r_2 - r_1},$$

we actually have $E[C_{now}(t)]=c$. However, we keep the current form so that it can be extended in the next section to cases where h is not necessarily equal to $$\frac{1}{r_2 - r_1}.$$

If, on the other hand, we decide to postpone the execution of q, then the cost $C_{delay}(t)$ is another random variable. We provide the detailed derivation of the expected value $E[C_{delay}(t)]$ in Appendix 10 and here just present the result:

$$E[C_{delay}(t)] = \frac{hc}{b}(e^{b(r_2-d)} - e^{b(r_1-d)})e^{bt}$$

$$E[C_{delay}(t)] = hc(t+r_2-d) + \frac{hc}{b} - \frac{hc}{b}e^{b(r_1-d)}e^{bt}$$

$$E[C_{delay}(t)] = (r_2 - r_1)hc.$$

Now we derive the overall priority score for Shepherd. Note that E[R] is a constant that is invariant over time. On the other hand, $E[C_{delay}(t)]$ and $E[C_{now}(t)]$, the expected costs of further postponing q and that of executing q right away, both change over time. At a give time t, we have $$p_q(t) = \begin{cases} \frac{hc}{E[R] \cdot b}(e^{b(r_2-d)} - e^{b(r_1-d)})e^{bt} & t + r_2 \le d \\ \frac{hc}{E[R] \cdot b} - \frac{hc}{E[R] \cdot b}e^{b(r_1-d)}e^{bt} & t + r_1 < d \le t + r_2 \\ 0 & d \le t + r_1. \end{cases}$$

In one particular case, namely a uniformly distributed execution time and a single-step SLA cost function, the Shepherd score increases exponentially up to time $d-r_2$ (referred to, hereinafter, as the floating stage) and then starts to decrease exponentially up to time $d-r_1$ (referred to as the sinking stage). After time $d-r_1$, the Shepherd score becomes 0.

The original CBS can be considered as a special case of Shepherd in which there is no sinking stage. That is, in the original CBS, the priority score increases exponentially until time d-r, and then suddenly drops to 0. Compared to the CBS score, the Shepherd score is more robust in that a small disturbance or error in the query execution time prediction does not change the priority score too much. Such a robustness is very important especially when we cannot predict r perfectly, which is the case in most of database applications.

Next, we extend Shepherd to handle more general scenarios. First, we extend the execution time distribution from uniform distributions to multiple-bucket histograms. Then we extend the SLA cost function from single-step functions to multiple-step functions. However, instead of giving the tedious technical details, in the discussion in this section, we present intuitive descriptions and omit the detailed derivations. The key observation we leverage to address the general case is the following:

The main operations we used to compute the Shepherd score, namely expectation, integration, and convolution, are all linear operations. Therefore, we can apply the superposition principle.

In the general cases, instead of a uniform distribution, we assume the distribution of the query execution time can be represented as a histogram with multiple buckets. A histogram-based representation is practical in many applications. For example, if a query q follows a query template (e.g., issued from a servlet from a Web server), then the execution time of historic queries from the same template can be used to infer q's execution time. The execution time of a large number of historic queries can be succinctly encoded in a histogram. As another example, very often, the prediction obtained from machine-learning approaches is not in the form of a single value (point estimation) but instead is in the form of a probability distribution (e.g., obtained from a Bayesian approach). Such probability distributions can be approximated by histograms with finite number of buckets.

It turns out that Shepherd can be easily extended from execution time following a uniform distribution (which can be considered as a histogram with a single bucket) to query execution time following a general histogram. The key observation is that in Equation (3), both $E[C_{delay}(t)]$ and $E[C_{now}(t)]$ are linear functions and as a result, we are able to compute $E[C_{delay}(t)]$ and $E[C_{now}(t)]$ for each bucket in the histogram separately and put the results together. (E[R] is a constant independent of t and can be derived from the histogram.) More specifically, we can decompose a general histogram vertically into the sum of individual buckets then handle each bucket by using the method in the previous section (recall that in the previous section, we intentionally used h instead of $$\frac{1}{r_2 - r_1}).$$

Finally, the results are aggregated to get the Shepherd score.

Following a similar line of thought, we rely on the linearity of the Shepherd score to extend from single-step SLA cost function to multiple-step SLA cost functions. For example, in a multiple-step SLA cost function with three deadlines and the corresponding costs, such an SLA turns out to be decomposable horizontally into the sum of three single-step cost functions. Then we can compute the priority score for each of the single-step cost functions and sum them to get the total priority score for Shepherd. By combining (i) the decomposition of the histogram of the query execution time and the decomposition of the multiple-step cost function, that the overall Shepherd score can be written as $$p_q(t) = \sum_{i,j} p_{qij}(t).$$

So far we have focused on computing the Shepherd score for a single query. In real applications, there can be a large number of queries to be prioritized at any given time. In this section, we develop a technique that achieves this prioritization with time complexity logarithmic in N, the number of queries to be prioritized.

For efficient prioritization, the time-varying Shepherd score for a query is mapped to a fixed point in the dual space of linear functions. This mapping is based on the following observation on the special form of the Shepherd score—for a query q, its Shepherd score at any given time t can always be written as $$p_q(t) = \alpha_q + \beta_q e^{bt},$$

where $\alpha_q$ and $\beta_q$ are constants (i.e., invariant with respect to t) for a certain period of time. We start with the simple case of a single-bucket histogram and a single-step cost function as shown in Equation (4). As can be seen, $p_q(t) = \alpha_q + \beta_q e^{bt}$ where the $(\alpha_q, \beta_q)$ pair only change value twice during the lifetime of q—once from the floating stage to the sinking stage, and once from the sinking stage to 0. Similar properties hold in the Shepherd score for the more general cases. The Shepherd score for the general cases can be written as the superposition of several buckets in the histogram of query execution time and several steps in the cost function. Therefore, it can be shown that with I buckets in the histogram and J steps in the cost function, $p_q$ (t) is always in the form of $\alpha_q + \beta_q e^{bt}$ where the $(\alpha_q, \beta_q)$ pair only change value finite times during the lifetime of q—it happens only when the left or right border of a bucket in the histogram "hits" a new step in the cost function, which occurs (I+1)J times in total.

We can map each query q to a point with coordinate $(\alpha_q, \beta_q)$ in the dual space of linear functions. Then at time t, to find the query with the highest Shepherd score at t, we "sweep" the dual space by using a line with slope $-e^{bt}$. It can be shown that (i) the first point hit by the sweeping line corresponds to the query with the highest Shepherd score at time t, and (ii) such a point is guaranteed to be on the convex hull of all the points in the dual space. In this method, the time-varying (relative) priorities among the queries are reflected by two types of dynamics in the dual space. First, the coordinate $(\alpha_q, \beta_q)$ for a query q can shift several times during the lifespan of q. Second, depending on time t, we use a sweeping line with different slope $-e^{bt}$ and therefore may hit different "corners" on the convex hull (and therefore pick different queries).

The system uses a method to maintain a planner convex hull incrementally. The rCBS offers the following features:
1. rCBS assumes that instead of an exact value, query execution time is estimated as a probability distribution, e.g., in the form of a histogram. By evaluating all the possible values of query execution time, together with the corresponding costs such as the SLA (service-level-agreement) penalty cost, rCBS assigns a cost and urgency aware priority score to each of the queries in real time.
2. rCBS is implemented in an efficient incremental fashion. The implementation is based on a novel method that maps dynamically changing rCBS scores to static points in a dual space, where these points are maintained by using an incremental convex hull data structure.

In one embodiment, we implemented the algorithm proposed by Overmars and von Leeuwen, which has an $O(\log^2 N)$ time complexity. For the implementation, a special data structure named concatenable queue] is needed. We implemented the concatenable queue by using a 2-3 tree, and we implemented the 2-3 tree by extending the left-leaning-red-black-tree. In total, our implementation of the dynamic convex hull algorithm consists of less than 1000 lines of Java code.

Exemplary pseudo code for rCBS is as follows:

| Algorithm 1: Operation insert( ) in rCBS. |
|---|
| input : a new query q; current time t |
| output: updated C and Q; |
| 1    $(q_\alpha, q_\beta) \leftarrow$ computeScore(q, t); |
| 2    C.add(q); |
| 3    q.validTime $\leftarrow$ q.computeValidTime(t); |
| 4    Q.add(q); |
| 5    return updated C and Q; |

| Algorithm 2: Operation pickBest( ) in rCBS. |
|---|
| input : current time t |
| output: the query q with the highest rCBS score |
| 1    while Q.top( ).validTime < t do |
| 2    \| q $\leftarrow$ Q.pop( ); |
| 3    \| C.delete(q); |
| 4    \| $(q_\alpha, q_\beta) \leftarrow$ computeScore(q, t); |
| 5    \| C.add(q); |
| 6    \| q.validTime $\leftarrow$ q.computeValidTime(t); |
| 7    \| Q.add(q); |
| 8    end |
| 9    q $\leftarrow$ C.best(t); |
| 10   C.delete(q); |
| 11   Q.delete(q); |
| 12   return q; |

Figure 4:
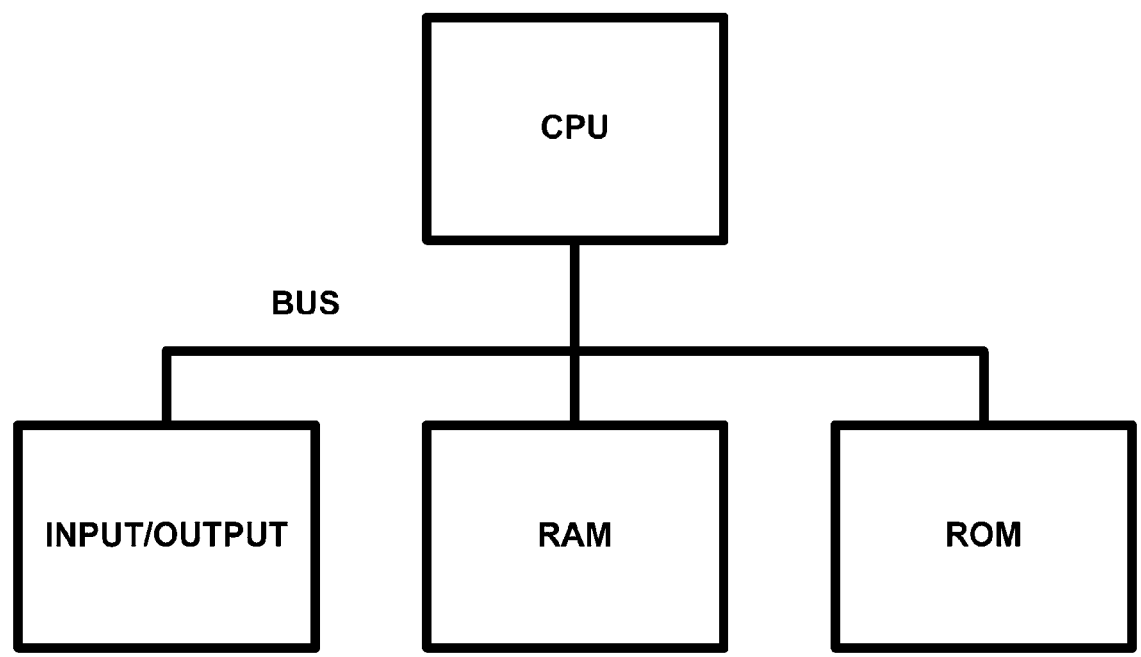
FIG. 4 shows a computer for processing FIGS. 1-3.

The invention may be implemented in hardware, firmware or software, or a combination of the three. FIG. 4 shows an exemplary computer to execute FIGS. 1-3. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for prioritizing queries in a cloud based database, comprising:
   determining a priority score in real time under an imprecise query execution time; and
   incrementally maintaining query priority scores; and
   managing the cloud based database using a processor to schedule queries with different service level agreements and imprecise query execution time using robust cost-based scheduling (rCBS), that does not require prior knowledge about the exact query execution time, wherein the rCBS explicitly evaluates all values of an execution time of a query and corresponding costs to handle queries with step-wise service level agreements (SLAs) functions in an O(log N) time complexity, where N is the number of queries are to be scheduled; and
   mapping a time-varying score for a query to a fixed point in a dual space of line function as $p_q(t)=\alpha_q+\beta_q e^{bt}$, where $\alpha_q$ and $\beta_q$ constants invariant with respect to t for a certain period of time, wherein t is time and q is query; and
   providing complexity/faster operation highly scalable rCBS for leveraging dynamic convex hull algorithms and the principle of superposition, which result in a logarithmic time complexity, and therefore it can efficiently handle large number of queries with different the SLAB in real time.

2. The method of claim 1, comprising determining the priority score by evaluating all possible values of the query execution time.

3. The method of claim 1, comprising determining the priority score by estimating an expected cost using a service level agreement and a resource cost.

4. The method of claim 1, comprising selecting a query that currently has a highest score for execution next.

5. The method of claim 1, comprising mapping the priority scores to static points in a dual space.

6. The method of claim 1, comprising incrementally maintaining a convex hull in a dual space.

7. The method of claim 1, comprising identifying a query with the highest priority score at a predetermined time.

8. The method of claim 1, comprising determining coefficients of the priority score with an rCBS method.

9. The method of claim 1, comprising mapping the priority score to a static point in a dual space with an expiration time.

10. The method of claim 1, comprising inserting a static point into an incrementally maintained convex hull.

11. The method of claim 1, comprising using a current time to check for queries whose positions in a convex hull have expired.

12. The method of claim 11, comprising updating expired queries by removing the queries from the convex hull, determining priority scores, and inserting the queries back to the convex hull.

13. The method of claim 1, comprising using a current time to conduct a binary search on the convex hull to queries with the highest priority.

14. A system for prioritizing queries in a cloud based database comprising a computer processor, a memory and a non-transitory computer readable medium embodying computer executable code having:
   the code for determining a priority score in real time under an imprecise query execution time; and
   the code for incrementally maintaining query priority scores; and
   the code for managing the cloud based database using a processor to schedule queries with different service level agreements and imprecise query execution time using robust cost-based scheduling (rCBS), that does not require prior knowledge about the exact query execution time, wherein the rCBS explicitly evaluates all values of an execution time of a query and corresponding costs to handle queries with step-wise service level agreements (SLAs) functions in an O(log N) time complexity, where N is the number of queries are to be scheduled; and
   the code for mapping a time-varying score for a query to a fixed point in a dual space of linear function as $p_q(t)=\alpha_q+\beta_q e^{bt}$, where $\alpha_q$ and $\beta_q$ constants invariant with respect to t for a certain period of time, wherein t is time and q is query; and
   providing complexity/faster operation highly scalable rCBS for leveraging dynamic convex hull algorithms and the principle of superposition, which result in a logarithmic time complexity, and therefore it can efficiently handle large number of queries with different the SLAB in real time.

15. The system of claim 14, comprising code for determining the priority score by evaluating all possible values of the query execution time.

16. The system of claim 14, comprising code for determining the priority score by estimating an expected cost using a service level agreement and a resource cost.

17. The system of claim 14, comprising code for selecting a query that currently has a highest score for execution next.

18. The system of claim 14, comprising code for mapping the priority scores to static points in a dual space.

19. The system of claim 14, comprising code for determining an SLA cost of a query.

* * * * *